3,682,892
7-HYDROXY LOWER ALKYL BENZODIAZEPINES

Robert Ye-Fong Ning, West Caldwell, and Leo Henryk Sternbach, Upper Montclair, N.J., assignors to Hoffmann-La Roche Inc., Nutley, N.J.
No Drawing. Filed Dec. 23, 1970, Ser. No. 101,184
Int. Cl. C07d 53/06
U.S. Cl. 260—239 BD          23 Claims

ABSTRACT OF THE DISCLOSURE

The present invention relates to 7-hydroxy lower alkyl benzodiazepines, compounds of biological interest as muscle relaxants, sedatives, and anti-convulsants.

---

The present invention relates to 7-hydroxy lower alkyl benzodiazepines of the formula

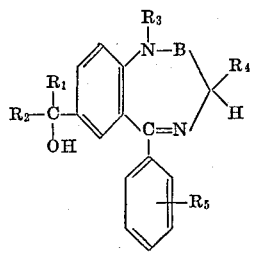

and of the formula

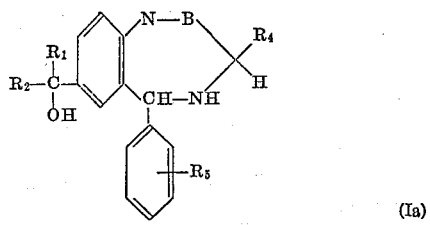

wherein B is selected from the group consisting of methylene (—$CH_2$—) and carbonyl (—CO—); $R_1$, $R_2$, $R_3$ and $R_4$ are each selected from the group consisting of hydrogen and lower alkyl and $R_5$ is selected from the group consisting of hydrogen and halogen.

The term "lower alkyl" as utilized herein, unless otherwise specified, connotes both straight and branched chain $C_1$–$C_6$, preferably $C_1$–$C_4$ hydrocarbon groups, such as methyl, ethyl, propyl, isopropyl, butyl, pentyl, hexyl and the like. By the term "halogen" as utilized herein there is contemplated all four forms thereof, i.e. chlorine, bromine, fluorine, and iodine, unless otherwise specified.

When $R_5$ is halogen, most preferred are the halogens, chlorine or fluorine, most preferentially, fluorine. Also, when $R_5$ is other than hydrogen, it is preferably joined to the 5-phenyl ring at the 2-position thereof. $R_4$ is preferably hydrogen. Also, in Formula I or Ia the most preferred member of the lower alkyl grouping recited therein is the lower alkyl grouping methyl. Thus, as is evident from the above, in Formula I or Ia, $R_1$, $R_2$ and $R_3$ are all preferentially hydrogen or methyl, $R_4$ is preferentially hydrogen and $R_5$ is preferentially hydrogen or fluorine and when fluorine is joined to the 5-phenyl ring at the 2-position thereof. Most preferred is a compound of the Formula I or Ia above wherein $R_1$ is hydrogen, $R_2$ is methyl, $R_3$ is hydrogen or methyl, $R_4$ is hydrogen and $R_5$ is fluorine. Also preferred are compounds wherein B is carbonyl.

Compounds of the Formula I or Ia above can be prepared starting with the corresponding compound of the formula

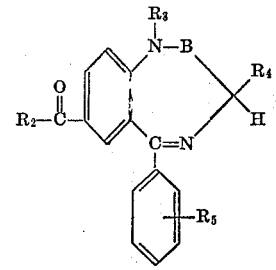

wherein B, $R_2$, $R_3$, R and $R_5$ are as above
by several preparative approaches.

The preparation of compounds of the Formula II above and IIa infra are disclosed in Ning and Sternbach copending patent applications Ser. No. 28,935, filed Apr. 15, 1970, and in application Ser. No. 877,490, filed Nov. 17, 1969, in the names of Wehrli, Fryer and Sternbach to be issued on Jan. 5, 1971, as U.S. Pat. No. 3,553,206, and in a Ning and Sternbach application entitled "Process for the Preparation of 7-Lower Alkanoyl Benzodiazepines From 7-(Ketal) Benzodiazepines," filed Dec. 23, 1970, as Ser. No. 101,117.

In one such preparative approach, a compound of the Formula I above wherein $R_1$ is hydrogen can be prepared by treating a compound of the Formula II above with a mild reducing agent such as a metal borohydride. Representative of metal borohydride useable for this purpose include, preferentially, alkali metal borohydrides such as sodium borohydride, potassium borohydride and the like. Alkaline earth metal borohydrides such as, magnesium borohydride can also be efficaciously utilized. By the use of a mild reductant such as a metal borohydride, the reduction of the carbonyl group in position-7 of the compound of the Formula I occurs without substantially effecting the other reduceable moieties present in the molecule under the reaction conditions employed.

The reduction with metal borohydride preferably proceeds in an inert organic solvent. Among the many inert organic solvents that may be advantageously utilized, there can be included lower alkanols such as methanol, ethanol, propanol and the like, ethers such as tetrahydrofuran and the like, dimethylsulfoxide, dimethylformamide and/or any other suitable inert organic solvent. Preferably, the reduction is effected at a temperature from about —20° to about 80°. In the most preferred process aspect, this reduction is effected at about a temperature range of from about 0° C. to about 25° C., most preferably at about room temperature.

In an alternate process aspect, compounds of the Formula II above wherein $R_3$ is hydrogen and B is C=O or when $R_3$ is hydrogen or lower alkyl and B is $CH_2$ can be treated with a lower alkyl lithium ($R_1Li$) in the manner described more fully hereinafter to obtain a compound of the Formula I wherein $R_1$ is lower alkyl. The most advantageous of the lower alkyl lithiums for the purposes of the present invention is methyl lithium. However, other lower alkyl lithiums can also be utilized such as ethyl lithium, propyl lithium, butyl lithium, pentyl lithium, and the like.

In a preferred embodiment, the reaction utilizing a lower alkyl lithium is carried out in the presence of an inert solvent. It will be appreciated that the use of such type solvent will ordinarily allow the reaction to proceed in a relatively simple manner, thereby avoiding the use of extraordinary conditions, extensive equipment and the like. Inert solvents capable of functioning efficaciously in this process step include benzene, tetrahydrofuran, dioxane and the like or any other appropriate inert solvent. Suitably, the reaction proceeds at temperatures much below room temperature. A preferred reaction temperature range is from about —100° to about 0°, most preferably between —80° to —50°.

Compounds of the Formula Ia wherein B is carbonyl can be prepared from the corresponding compounds of the formula

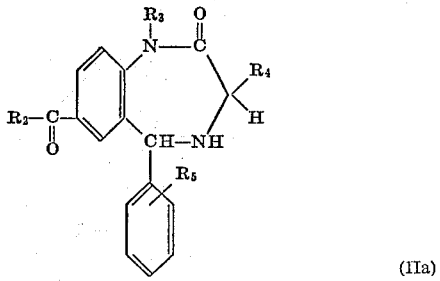

(IIa)

wherein $R_2$, $R_3$, $R_4$ and $R_5$ are as above in the same manner as described above in connection with the conversion of a compound of the Formula II into the corresponding compound of the Formula I.

Compounds of the Formula Ia wherein B is carbonyl can be prepared from the corresponding compounds of the pound of the formula

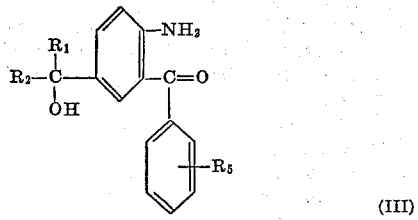

(III)

wherein $R_1$, $R_2$, and $R_5$ are as above with a halo-lower alkanoyl leaving group containing compound of the formula

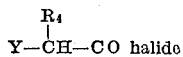

(halide preferably representing the chloride or the bromide grouping)

or the corresponding anhydride of the formula

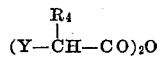

wherein Y is halogen or any other suitable leaving group such as lower alkylsulfonyloxy, e.g., mesyloxy or a phenyl sulfonyloxy group, e.g., benzene sulfonyloxy, tosyloxy and the like, whereby to obtain the corresponding compound of the formula

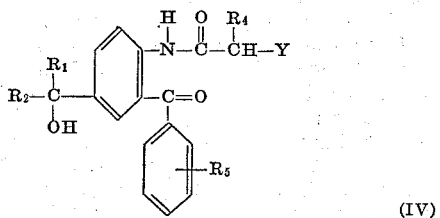

(IV)

wherein Y, $R_1$, $R_2$, $R_4$, and $R_5$ are as above.

Suitable halo lower alkanoyl halides, or corresponding anhydrides are preferably represented by chloroacetyl chloride, bromoacetyl bromide, bromoacetyl chloride, bromopropionyl chloride, chloroacetic anhydride, chloroisopropionic anhydride and the like. From the above, it should be evident, that when Y is halogen, it is preferably selected from the group consisting of chlorine and bromine Representative of compounds of the formula

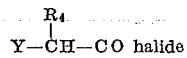

or the corresponding anhydride thereof wherein Y is lower alkyl sulfonyloxy or a phenyl sulfonyloxy are mesyloxy acetyl chloride, tosyloxy acetyl chloride, mesyloxyacetic anhydride, tosyloxyacetic anhydride and phenylsulfonyl acetic anhydride.

It should be noted that in order to insure the best yields of the desired compound, no more than one or a little more than one equivalent of the acylating agent should be used. Due to the greater reactivity of the amino group, selective acylations can be achieved by proper practices well known in the art.

Suitably this process aspect is effected in the presence of an inert organic solvent such as benzene, ether, methylene chloride and the like. Temperature and pressure are not critical to a successful performance of this step. However, in a preferred aspect, this step is conducted at room temperature or elevated temperatures, e.g., at about the reflux temperature of the reaction mixture.

A compound of the Formula IV above or its lower alkyl derivative can be treated with ammonia and the resulting compound of the formula

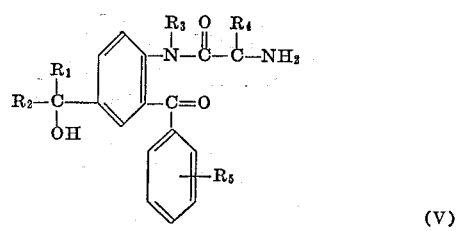

(V)

wherein $R_1$, $R_2$, $R_3$, $R_4$ and $R_5$ are as above can be ring closed to the corresponding compound of the Formula I above. The ring closure can be effected in the reaction medium in which the compound of the Formula V was prepared, without isolating same or interrupting the reaction sequence before the desired compound of the Formula I above is obtained.

For example, a compound of the Formula IV can be placed in a lower alkanoic suspension of ammonia such as ethanolic ammonia or methanolic ammonia and, subsequently, after a period of several hours, for example, overnight, the corresponding 7-hydroxy lower alkyl benzodiazepine represented by the Formula I above can be recovered. The cyclization can be accelerated by heating.

In another embodiment, in lieu of methanolic ammonia, the compound of the Formula IV above can be dissolved in an inert organic solvent such as methylene chloride, carbon tetrachloride, ethers such as tetrahydrofuran, dioxane and ethyl ether, dimethylsulfoxide, dimethylformamide and the like and the resultant solution can be treated with liquid ammonia whereby a compound of the Formula V above results. The so-obtained compound of the Formula V above either in crude or in a more purified form, can be added to an inert organic solvent such as a lower alkanol, e.g., methanol, ethanol and the like. By permitting the resultant solution to stand and/or by the application of heat, cyclization to the corresponding compound of the Formula I above occurs.

A compound of the Formula III above can be prepared via the reaction of a compound of the formula

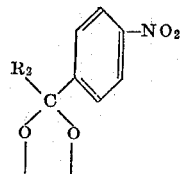

(VI)

wherein $R_2$ is as above with a compound of the formula

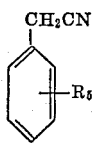

(VII)

wherein $R_5$ is as above to yield a compound of the formula

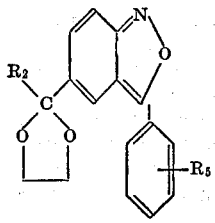

(VIII)

wherein $R_2$ and $R_5$ are as above.

The preparation of a compound of the Formula VIII above proceeds preferably in the presence of an inert organic solvent. Representative of such solvents are alcohols, for example, lower alkanols such as, ethanol and methanol, dimethyl sulfoxide, and dimethyl formamide. Preferred are lower alkanols particularly methanol.

It is essential that a base be present during this step and any suitable base may be employed. However, an alkali metal hydroxide such as sodium hydroxide is advantageously utilized during the reaction of a compound of the Formula VI with a compound of the Formula VII to form a compound of the Formula VIII. For this reaction step, it is preferable that the temperature be maintained in the range of from about room temperature to about 100° C., most preferably, from about room temperature to about 60° C. The product of the Formula VII need not be isolated prior to conversion to a compound of the Formula VIII but in a preferred aspect, it is preferably isolated from the reaction mass.

Compounds of the Formula VIII above are converted readily into the corresponding compounds of the formula

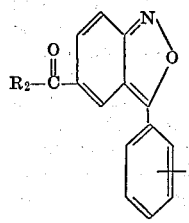

(IX)

wherein $R_2$ and $R_5$ are as above by any suitable readily available hydrolyzing technique conducted at a pH of below 7. In the most preferred embodiment, the hydrolysis of the compound of the Formula VIII to the corresponding compound of the Formula IX is effected by simple solution in aqueous mineral acid. Inert organic solvents such as dimethylformamide, lower alkanols such as methanol, dimethylsulfoxide, ethers, such as tetrahydrofuran and dioxane may be added as solubilizing agents. Temperature and pressure are not critical to a successful performance of this process step, but it is preferred to effect the reaction at a temperature range from about —10° to about 100°, most preferably, at about 10 to 30°, most advantageously at about room temperature. Suitably, in a most preferred embodiment as is noted above, the hydrolysis is effected in an aqueous solution of an acid, preferably a 3 N to 12 N acid. The acid agent can be provided by any suitable conveniently available technique such as the addition of the acid agent to a medium containing a compound of the Formula VIII. Acid agents can be represented by mineral acids such as nitric acid, hydrochloric acid, aqueous hydrobromic acid, sulfuric acid and the like or an organic acid such as sulfonic acids, i.e., toluenesulfonic acid or methane sulfonic acid, trihaloacetic acids such as trifluoroacetic acid and other strong carboxylic acids such as oxalic acid. The particular acid agent utilized is not critical and can be selected by the artisan from the many he will readily recognize are suitable for the purposes of the present invention.

Compounds of the Formula IX above can be converted into the corresponding compound of the formula

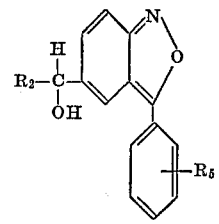

(X)

wherein $R_2$ and $R_5$ are as above by the treatment thereof with an alkali metal borohydride or into a compound of the formula

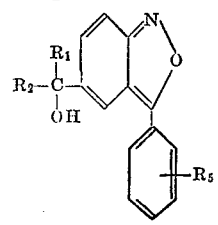

(XI)

wherein $R_1$, $R_2$ and $R_5$ are as above by the treatment of a compound of the Formula IX above with an $R_1Li$ wherein $R_1$ is as above. The treatment of a compound of the Formula IX with an alkali metal borohydride or an $R_1Li$ is effected in the same manner as described above in connection with the conversion of a compound of the Formula II into the corresponding compound of the Formula I.

A compound of the Formula X or XI above can be converted into a compound of the Formula III above by the catalytically hydrogenation of either. Catalysts suitable for this purpose include palladium on carbon, platinum, nickel and cobalt with palladium on carbon being the preferred catalyst. Such catalytically hydrogenation (that is to say, reduction) is effected in the presence of any suitable inert organic solvent medium. Representative of such inert organic solvent mediums are tetrahydrofuran, dimethylformamide and lower alkanols such as methyl alcohol, ethyl alcohol and the like. It is preferable when proceeding from a compound of the Formula X or XI to a compound of the Formula III that the reaction be ended when the theoretical amount of hydrogen is absorbed. If the amount of hydrogen employed exceeds the theoretical amount, it is conceivable that competing side reactions may occur. Hence, in order to avoid this event and insure the highest yields possible, the preference for the use of theoretical amounts of hydrogen should be quite clear.

Compounds of the Formulas I, Ia and IV above wherein $R_3$ is hydrogen can be converted into the corresponding compounds wherein $R_3$ is lower alkyl by first forming the sodio derivative of a compound of the Formula I, Ia or IV above wherein $R_3$ is hydrogen, with an alkali metal alkoxide, e.g., sodium methoxide, potassium t-butoxide and the like or an alkali metal hydride, such as sodium hydride and the like and treating the said sodio derivative with an alkylating agent such as a lower alkyl halide, e.g., methyl iodide or ethyl iodide, a dilower alkyl sulfate, such as dimethylsulfate and the like whereby alkylation of the nitrogen atom in the 1-position of the benzodiazepine or of the nitrogen atom in the compound of the Formula IV results.

Compounds of the Formula I can be converted into the corresponding compounds of the Formula Ia above by reducing the former by any conveniently available technique. For example, the reduction of a compound of the Formula I above to a compound of the Formula Ia above can be effected catalytically by hydrogenation in the presence of a platinum catalyst. Also, the reduction can be effected utilizing Raney nickel. Conveniently, the reduction is effected in the presence of any suitable inert organic solvent. Among the many solvents there can be included lower alkanols such as methanol, ethanol and the like, ethers such as diethyl ether and tetrahydrofuran and similar solvents. Temperature is not critical to a successful performance of the reduction step and so the reduction can be conducted at room temperature or above or below room temperature.

Compounds of the Formula Ia above wherein $R_1$ is hydrogen can also be prepared directly from a compound of the Formula II above by catalytic reduction, preferably using platinum as catalyst under similar conditions as described for the conversion of Formula I to Ia. In this manner, the $R_2$—CO grouping and the 4,5-double bond in the Formula II above are, respectively, reduced to a

grouping and the radical

whereby the corresponding compound of the Formula Ia is obtained. Suitably about two mole equivalents of platinum are employed in this reduction step.

If desired, compounds of the Formula Ia obtained directly from a compound of the Formula II above can be converted into the corresponding compound of the Formula I above by treating the compound of the Formula Ia above with any suitable oxidizing system capable of causing selective oxidation whereby the double bond at the 4,5-position of the compound of the Formula I above results.

A preferred oxidizing agent for the purpose of this process aspect is diethylazodicarboxylate. The oxidation is expediently carried out in the presence of an inert organic solvent such as aromatic hydrocarbons, e.g. benzene, toluene and the like, halogenated hydrocarbons, carbon tetrachloride; ethers, e.g. dioxane, tetrahydrofuran and the like, and advantageously at a temperature between about room temperature and the reflux temperature of the solvent.

As is indicated above, the compounds of the Formula I and Ia above are useful as anti-convulsants, muscle relaxants and sedatives. Such compounds can be formulated into pharmaceutical preparations in admixture with a compatible pharmaceutical carrier and can be administered enterally or parenterally with dosages suited to fit the exergencies of a pharmacological situation. As contemplated by this invention, the novel compounds of the Formulas I and Ia can be embodied in a pharmaceutical dosage formulation containing from about 0.5 mg. to about 200 mg. of active substance with dosage adjusted to species and individual requirements (parenteral formulations would ordinarily contain less of the active substance than compositions intended for oral administration). The novel compounds of this invention can be administered alone or in combination with pharmaceutically acceptable carriers as indicated above in a wide variety of dosage forms. Suitably, the dosage regimen consist of four tablets of 50 mg. each given daily.

In addition to compounds of the Formulas I and Ia above, there is also encompassed within the invention, the pharmaceutically acceptable salts of said compounds and the compounds of the Formulas I and Ia above can be administered in the form of such salts. The compounds of the Formulas I and Ia above form acid addition salts with pharmaceutically acceptable acids, for example, with organic or inorganic acids such as hydrochloric acid, hydrobromic acid, sulfuric acid, phosphoric acid, nitric acid, citric acid, tartaric acid, salicylic acid, ascorbic acid, maleic acid, formic acid and the like.

Solid preparations of compounds of the Formula I or Ia above or salts thereof for oral administration can include tablets, capsules, powders, granules, emulsions, suspensions and the like. The solid preparations may comprise an inorganic carrier, e.g., talc, or an organic carrier, e.g., lactose, starch. Additives such as magnesium stearate (a lubricant) can also be included. Liquid preparations containing a compound of the Formula I or Ia above or salts thereof such as solutions, suspensions or emulsions may comprise the usual diluents such as water, petroleum jelly and the like, a suspension media such as polyoxyethylene glycols, vegetable oils and the like. They may also contain other additional ingredients such as preserving agents, stabilizing agents, wetting agents, salts for varying the osmotic pressure or buffers. They may also contain, in combination, other therapeutically useful substances.

The following examples are illustrative but not limitative of the present invention. All temperatures are stated in degrees centigrade.

EXAMPLE 1

A solution of 3.0 g. (10.8 mmoles) of 7-acetyl-5-phenyl-1,3-dihydro-2H-1,4-benzodiazepin-2 - one and 570 mg. (15.0 mmoles) of sodium borohydride in 100 ml. of ethanol was stirred at room temperature for 2 hours. The solution was poured into a mixture of 400 ml. of water and 800 ml. of methylene chloride and stirred for 15 minutes. The methylene chloride layer was separated, washed twice with water, dried over anhydrous sodium sulfate, and evaporated to dryness. The residue on crystallization from ether yielded 1,3-dihydro-7 - (1 - hydroxyethyl)-5-phenyl-2H-1,4-benzodiazepin-2-one of a light yellow solid, M.P. 214–216°.

EXAMPLE 2

A solution of 2.96 g. (10 mmoles) of 7-acetyl-5-(2-fluorophenyl)-1,3-dihydro-2H-1,4-benzodiazepin - 2 - one and 570 mg. (15.0 mmoles) of sodium borohydride in a mixture of 100 ml. of ethanol and 100 ml. of tetrahydrofuran was stirred at room temperature for 2 hours.

The mixture was partitioned between 800 ml. of water and 800 ml. of methylene chloride. The methylene chloride layer was separated, washed twice with water, dried over anhydrous sodium sulfate and evaporated to dryness. The residue on crystallization from ether yielded 1,3-dihydro-5-(2-fluorophenyl)-7-(1 - hydroxyethyl)-2H-1,4-benzodiazepin-2-one, a light yellow solid, M.P. 222–224°.

EXAMPLE 3

A solution of 530 mg. (1.7 mmole) of 7-acetyl-5-(2-fluorophenyl) - 1 - methyl - 2H - 1,4 - benzodiazepin-2-one and 100 mg. (2.6 mmole) of sodium borohydride in 20 ml. of ethanol was stirred at room temperature for 2 hrs.

The mixture was poured into 200 ml. of water and extracted with 4 portions of 50 ml. of methylene chloride. The combined methylene chloride layers were washed twice with water, dried over anhydrous sodium sulfate, then evaporated to dryness. The residual oil crystallized from ether-pentane to yield 1,3-dihydro-5-(2-fluorophenyl) - 7 - (1 - hydroxyethyl) - 1 - methyl - 2H - 1,4-benzodiazepin-2-one of light yellow prisms, M.P. 133–135°.

EXAMPLE 4

To a solution of 1.50 g. (5.05 mmole) of 1,3-dihydro-7 - (1 - hydroxyethyl) - 5 - (2 - fluorophenyl) - 2H - 1,4-benzodiazepin-2-one in 30 ml. of dimethylformamide chilled in an ice-bath under nitrogen, was added 255 mg. (5.5 mmole) of a 57% dispersion in oil of sodium hydride. After stirring for 20 min., 850 mg. (6.0 mmoles)

of methyl iodide was added and the mixture was kept at 0° C. for 15 hours.

The reaction mixture was poured into 150 ml. of ice water, and was extracted twice with 150 ml. portions of methylene chloride. The combined methylene chloride layers were dried over anhydrous sodium sulfate and evaporated to dryness. The residue crystallized from ether-pentane to yield 1,3-dihydro-7-(1-hydroxyethyl)-5-(2-fluorophenyl) - 1 - methyl - 2H - 1,4-benzodiazepin-2-one, M.P. 133–135.5°.

EXAMPLE 5

A solution of 2.92 g. (10 mmoles) of 1,3-dihydro-5-phenyl-7-propionyl-2H-1,4-benzodiazepin-2-one and 570 mg. (15 mmole) of sodium borohydride in 100 ml. of ethanol was stirred at room temperature for 2 hrs. The solution was poured into a mixture of 500 ml. of water and 500 ml. of methylene chloride and stirred for 15 min. The methylene chloride layer was separated, washed twice with water, dried over anhydrous sodium sulfate and evaporated to dryness. The residue crystallized from ether to yield 1,3 - dihydro - 7 - (1 - hydroxypropyl)-5-phenyl-2H-1,4-benzodiazepin-2-one as light yellow amorphous solid, M.P. 179–181°.

EXAMPLE 6

A solution of 3.2 g. (10 mmoles) of 1,3 - dihydro - 7-pentanoyl - 5 - phenyl - 2H - 1,4 - benzodiazepin-2-one and 570 mg. (15.0 mmole) of sodium borohydride in 100 ml. of ethanol was stirred at room temperature for 2 hrs.

The mixture was poured into a mixture of 1 l. of water and 800 ml. of methylene chloride and stirred for 15–20 min. The methylene chloride layer was separated, dried over anhydrous sodium sulfate and evaporated to dryness. The oily residue crystallized from ether-pentane to yield 1,3 - dihydro - 7 - (1 - hydroxypentyl) - 5 - phenyl-2H-1,4-benzodiazepin-2-one as mushroom shaped clusters of yellow solid, M.P. 172–174°.

EXAMPLE 7

A mixture of 22.8 g. (60 mmoles) of 2,3-dihydro-7-iodo - 1 - methyl - 5 - (2 - fluorophenyl)-1H-1,4-benzodiazepine and 10.8 g. (120 mmoles) of cuprous cyanide in 200 ml. of dimethylformamide was heated to reflux under a nitrogen atmosphere for 2 hrs.

The reaction mixture was poured, while hot, into 1000 ml. of ice and water. The yellow precipitate formed was collected on a filter, then stirred with 800 ml. of methylene chloride and 800 ml. of water containing 30.0 g. (0.61 mole) of sodium cyanide for 2 hrs. (until almost all solids dissolved). The methylene chloride layer was separated, washed with two portions of 500 ml. of water, dried over anhydrous sodium sulfate and evaporated to dryness. The residue crystallized from ether yielding 7-cyano - 2,3 - dihydro - 5 - (2-fluorophenyl)-1-methyl-1H-1,4-benzodiazepine as colorless crystalline needles, M.P. 135–137°.

The starting material 2,3-dihydro-7-iodo-1-methyl-5-(2-fluorophenyl)-1H-1,4-benzodiazepine was prepared as follows:

A solution of 105 g. (0.7 mole) of N-methyl-N-(2-aminoethylaniline, in 500 ml. of benzene was added over a period of 0.5 hr. to a stirred solution of 111 g. (0.7 mole) of o-fluorobenzoyl chloride in 3 l. of benzene at 25°. The mixture was then stirred under reflux for 3 hr., cooled to 15°, treated with 380 ml. of 2 N sodium hydroxide and stirred at room temperature for 0.5 hr. The benzene layer was separated, dried over magnesium sulfate, and concentrated in vacuo. The residue was crystallized from cold hexane to give 2-fluoro-N-[2-(methylphenylamino)ethyl]benzamide, M.P. 43–48°. Recrystallization from ether/petroleum ether gave colorless prisms, M.P. 52–54°.

To a solution of 54.4 g. (0.2 mole) of 2-fluoro-N-[2-(methylphenylamino)ethyl]benzamide in 400 ml. of phosphorus oxychloride was added 42.6 g. (0.3 mole) of phosphorus pentoxide and the mixture was stirred and heated under reflux for 3 hr. From the solution 360 ml. of phosphorus oxychloride was distilled at 63–66°/220 mm. The residue was cooled and treated with 500 ml. of methylene chloride, 400 ml. of 6 N sodium hydroxide and 1 kg. of ice. After standing for 1 hr. the liquid phases were separated from the solid. The solid was treated with sodium bicarbonate solution and allowed to stand for 1.5 hr. This mixture was extracted with methylene chloride. The methylene chloride extracts were combined, dried over sodium sulfate and concentrated in vacuo to give 5-(2 - fluorophenyl) - 2,3 - dihydro-1-methyl-1H-1,4-benzodiazepine as yellow prisms, M.P. 105–110°. Recrystallization of the product from ethyl acetate/petroleum ether gave off-white prisms, M.P. 114–117°.

A solution of 137.5 g. (0.54 mole) of 5-(2-fluorophenyl)-2,3-dihydro-1-methyl-1H-1,4-benzodiazepine in 3 l. of 1.8 M sulfuric acid was cooled to 15° in an ice bath and treated dropwise over a period of 0.5 to 0.7 hr. with a solution of 195 g. (1.2 mole) of iodine monochloride in 500 ml. of acetic acid. This mixture was stirred in the ice bath for 1 hr. after the addition was complete. The precipitated red solid was collected. Recrystallization from ethanol gives red needles, M.P. 164–165°.

The crude red solid was suspended in 1.5 l. of methylene chloride and stirred with 1.2 l. of saturated sodium bisulfite solution. The mixture was cooled and the pH adjusted to 8–9 with concentrated ammonium hydroxide. The organic phase was separated, dried over sodium sulfate and filtered through 1.3 kg. of alumina using 3 l. of methylene chloride for wash. The filtrate was concentrated in vacuo to a thick oil which was dissolved in 1 l. of boiling hexane. The hot solution was filtered and cooled to give 2-(2-fluorophenyl)-2,3-dihydro-7-iodo-1-methyl-1H-1,4-benzodiazepine, M.P. 102–105°.

EXAMPLE 8

To a solution of 2.79 g. (10 moles) of 7-cyano-2,3-dihydro - 5 - (2-fluorophenyl) - 1 - methyl-1H-1,4-benzodiazepine in 100 ml. of dry tetrahydrofuran, chilled in a solid $CO_2$ bath to −70° C., was added 25 ml. (50 mmoles) of 2.0 M solution of methyl lithium in ether under a nitrogen atmosphere. The reaction mixture was stirred at −70° C. for 2 hrs., then poured into 1000 ml. of 1 N HCl and was stirred at room temperature for twenty minutes. The mixture was basified to about pH 9 with 3 N sodium hydroxide. The aqueous and tetrahydrofuran layers were separated. The aqueous layer was extracted with two portions of 250 ml. of methylene chloride. The tetrahydrofuran layer was combined with the methylene chloride layers and was washed twice with water, dried over anhydrous sodium sulfate and evaporated to dryness. The residue was crystallized from ether-pentane to yield 7-acetyl-2,3-dihydro-5-(2-fluorophenyl) - 1 - methyl-1H-1,4-benzodiazepine as buff colored prisms, M.P. 112–114°.

EXAMPLE 9

A solution of 1.92 g. (6.5 mmole) of 7-acetyl-2,3-dihydro-1-methyl - 5 - (2-fluorophenyl) - 1H - 1,4 - benzodiazepine and 340 mg. (9.0 mmole) of sodium borohydride in 60 ml. of ethanol was stirred for 2 hrs.

The mixture was poured into 300 ml. of water, and extracted with 300 ml. of methylene chloride. The methylene chloride layer was separated, dried over anhydrous sodium sulfate, and evaporated to dryness. The residual oil crystallized from ether-pentane to yield 2,3-dihydro-5-(2-fluorophenyl)-7-(1 - hydroxyethyl) - 1 - methyl-1H-1,4-benzodiazepine as light yellow prisms, M.P. 125–127°.

EXAMPLE 10

To a solution of 2.78 g. (10 mmole) of 7-acetyl-5-phenyl-1,3,-dihydro-2H-1,4-benzodiazepin-2-one in 100 ml. of dry tetrahydrofuran chilled in a solid $CO_2$ bath to −70° C., was added 30 ml. (45 mmole) of 1.5 M solution of methyl lithium in ether under a nitrogen atmosphere. The reaction mixture was stirred at −70° C. for 2 hrs., then poured into 1000 ml. of 1 N HCl and was stirred at room temperature for 20 minutes. The mixture was then basified to about pH 9 with 3 N sodium hydroxide. The aqueous and tetrahydrofuran layers were separated. The aqueous layer was extracted with two portions of 250 ml. of methylene chloride. The tetrahydrofuran layer was combined with the methylene chloride layers, and was washed twice with water, dried over anhydrous sodium sulfate and evaporated to dryness. The residue crystallized from ether yielding 1,3-dihydro-7-(1-hydroxy - 1 - methylethyl) - 5 - phenyl-2H-1,4-benzodiazepin-2-one as light yellow amorphous powder, M.P. 227–229°.

EXAMPLE 11

To a solution of 1.00 g. (3.4 mmoles) of 7-acetyl-1,3-dihydro-5-(2-fluorophenyl) - 2H - 1,4 - benzodiazepin-2-one in 100 ml. of dry tetrahydrofuran, chilled in a solid $CO_2$ bath at −70° C. was added, under nitrogen, 10 ml. (20 mmoles) of a 2 N solution of methyl lithium in ether. After stirring at −70° C. for 90 min., the mixture was diluted with 150 ml. of 1 N HCl, and was allowed to stir at room temperature for 20 min. The mixture was then neutralized to about pH 8 with 3 N NaOH (about 30 ml.). The aqueous and tetrahydrofuran layers were separated; the aqueous layer was extracted twice with 100 ml. portions of methylene chloride, the tetrahydrofuran and methylene chloride layers were combined, washed with two 150 ml. portions of water, dried over anhydrous sodium sulfate and evaporated to dryness. The residue crystallized from ether yielding 1,3-dihydro-5-(2-fluorophenyl) - 7 - (1-hydroxy - 1 - methylethyl)-2H-1,4-benzodiazepin-2-one as light yellow prisms, M.P. 230–232°.

EXAMPLE 12

To a solution of 560 mg. (2.0 mmole) of 5-phenyl-7-(1-hydroxyethyl) - 1,3 - dihydro-2H-1,4-benzodiazepin-2-one in 75 ml. of tetrahydrofuran was added 200 mg. of PtO. The mixture was hydrogenated at 1 atmosphere overnight (15 hrs.).

The catalyst was removed by filtration. The tetrahydrofuran solution was evaporated to dryness. The residue crystallized from ether-pentane to yield 7-(1-hydroxyethyl)-5-phenyl-1,3,4,5-tetrahydro - 2H - 1,4 - benzodiazepin-2-one as a colorless solid, M.P. 159–161°.

EXAMPLE 13

A solution of 18.8 g. (78 mmoles) of 5-acetyl-3-phenyl-2,1-benzisoxazole and 5.90 g. (156 mmoles) of sodium borohydride in a mixture of 1 l. of ethanol and 400 ml. of tetrahydrofuran was allowed to stand at room temperature. After 18 hours, excess hydride was decomposed with acetic acid. The mixture was neutralized with sodium bicarbonate, then concentrated to a small volume. The residue was partitioned between methylene chloride and water. The methylene chloride layer was washed with water, dried and evaporated. Crystallization of the residue from methanol gave 5-(1-hydroxyethyl)-3-phenyl-2,1-benzisoxazole, M.P. 94–95°.

EXAMPLE 14

A solution of 600 mg. (2.5 mmoles) of 5-(1-hydroxyethyl)-3-phenyl-2,1-benzisoaxzole in 25 ml. of tetrahydrofuran was hydrogenated at 1 atmosphere in the presence of 200 mg. of 10 percent palladium on carbon. Hydrogen uptake was complete within 40 minutes. Catalyst was removed by filtration. Evaporation of tetrahydrofuran gave an oil which after crystallization and recrystallization from ether-petroleum ether gave 2-amino-5-(1-hydroxyethyl)benzophenone as yellow needles, M.P. 107–109°.

EXAMPLE 15

A mixture of 12.7 g. (50 mmoles) of 2-amino-5-(1-hydroxyethyl)benzophenone, 10.4 g. (50 mmoles) of chloroacetic anhydride and 150 ml. of benzene was kept at 5° overnight. The benzene solution was washed with saturated $NaHCO_3$ and water, then dried and evaporated. Crystallization of the residue from ethanol gave 2'-benzoyl-2-chloro-4'-(1-hydroxyethyl)acetanilide.

EXAMPLE 16

A mixture of 12.4 g. (39 mmoles) of 2'-benzoyl-2-chloro - 4' - (1 - hydroxyethyl)acetanilide, 11.6 g. (78 mmoles) of sodium iodide and 500 ml. of acetone was heated under reflux for 0.5 hour. On cooling, the inorganic solids which contained 2'-benzoyl-2-iodo-4'-(1-hydroxyethyl)acetanilide were filtered. Acetone was evaporated in vacuo. The residue was dissolved in 150 ml. of tetrahydrofuran and added to a 1 l. 3-necked flask equipped with a stirrer and a Dry Ice condenser and containing 400 ml. of liquid ammonia. The mixture was stirred under refluxing ammonia for 5 hours whereby 2'-benzoyl-2-amino - 4' - (1-hydroxyethyl)acetanilide was formed. Excess ammonia was allowed to evaporate overnight. The inorganic solids were removed by filtration. The tetrahydrofuran was evaporated. The residual oil was dissolved in 200 ml. of ethanol and was heated under reflux for 2 hours. On cooling and concentration of the solution, 1,3 - dihydro-7-(1-hydroxyethyl)-5-phenyl-2H-1,4-benzodiazepin-2-one crystallized, M.P. 214–216°.

EXAMPLE 17

A 25 mg. capsule containing the following:

| | Mg./capsule |
|---|---|
| 1,3-dihydro-7-(1-hydroxyethyl)-5-phenyl - 2H - 1,4-benzodiazepin-2-one | 25 |
| Lactose | 153 |
| Corn starch | 30 |
| Magnesium stearate | 2 |
| Total weight | 210 | can be prepared as follows:

Blend drug with lactose, and corn starch in a suitable mixer. Pass blended mixture through a Fitzmill machine to obtain uniform mixture. Return powders to blender, add talc and premix. Fill into empty hard shell capsule, No. 4 size on a capsule filling machine.

EXAMPLE 18

A 25 mg. tablet formulation containing the following:

| | Mg./tablet |
|---|---|
| 1,3-dihydro-7-(1-hydroxyethyl)-5-phenyl - 2H - 1,4-benzodiazepin-2-one | 25 |
| Dicalcium phosphate, dihydrate, unmilled | 150 |
| Corn starch | 30 |
| Microcrystalline cellulose | 23 |
| Calcium stearate | 2 |
| Total weight | 230 | can be prepared as follows:

Blend ingredients (except the calcium stearate) in a suitable mixer. Pass the mixture through a Fitzmill using a #1A screen at medium speed. Return to mixer and add calcium stearate. Compress on a pallet machine.

EXAMPLE 19

A parenteral formulation containing:

| | | |
|---|---|---|
| 1,3 - dihydro-7-(1-hydroxyethyl)-5-phenyl-2H-1,4-benzodiazepin-2-one | mg./ml | 1 |
| Benzyl alcohol | ml | 0.015 |
| Propylene glycol | ml | 0.5 |
| Ethyl alcohol, 1 | ml | 0.1 |
| Disodium edetate | mg | 0.1 |
| Sodium acetate | mg | 1.4 |
| Glacial acetic acid | mg | 0.6 |
| Sodium hydroxide | | (1) |
| Water for injection, q.s. to 1 ml. | | |

[1] To adjust pH to approximately 6.

can be prepared as follows:

Add drug to a mixture of propylene glycol and benzyl alcohol. Blend slightly with stirring to effect solution. Cool, then add ethyl acohol, and disodium edetate, sodium acetate and glacial acetic acid dissolved in part of the water for injection. Adjust pH with sodium hydroxide or acetic acid, and add required volume of water for injection. Filter through sterile Selus 02 candle and fill into sterile 2 cc. amber ampule. Gas with nitrogen and seal. Inspect.

We claim:

1. A compound of the formula

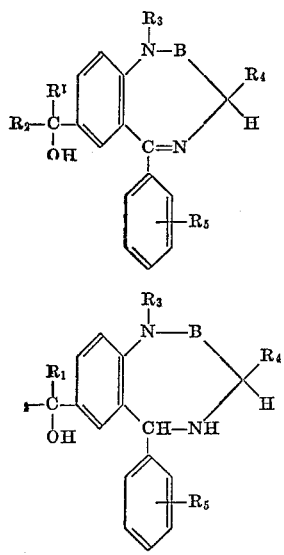

wherein B is selected from the group consisting of methylene (—CH$_2$—) and carbonyl (C=O), R$_1$, R$_2$ and R$_3$ and R$_4$ are each selected from the group consisting of hydrogen and lower alkyl and R$_5$ is selected from the group consisting of hydrogen and halogen
and the acid addition pharmaceutically acceptable salts thereof.

2. A compound as defined in claim 1 wherein R$_4$ is hydrogen.

3. A compound as defined in claim 1 of the formula

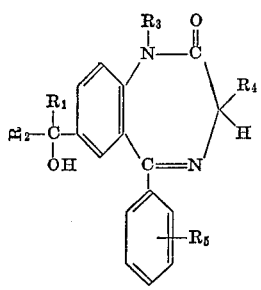

whereinR$_1$, R$_2$ and R$_3$ and R$_4$ are each selected from the group consisting of hydrogen and lower alkyl and R$_5$ is selected from the group consisting of hydrogen and halogen
and the pharmaceutically acceptable acid addition salts thereof 4. A compound as in claim 3 wherein R$_4$ is hydrogen.

5. A compound as in claim 4 of the formula 1,3-dihydro - 7 - (1-hydroxy-lower alkyl)-5-phenyl-2H-1,4-benzodiazepin-2-one.

6. A compound as in claim 5 of the formula 1,3-dihydro-7-(1 - hydroxyethyl)-5-phenyl-2H-1,4-benzodiazepin-2-one.

7. A compound as defined in claim 4 of the formula 1,3-dihydro-5-(2-halophenyl)-7-(1-hydroxy lower alkyl)-2H-1,4-benzodiazepin-2-one.

8. A compound as defined in claim 7 of the formula 1,3-dihydro-5-(2 - fluorophenyl)-7-(1-hydroxyethyl)-2H-1,4-benzodiazepin-2-one.

9. A compound as defined in claim 4 of the formula 1,3-dihydro - 5 - (2-fluorophenyl)-7-(1-hydroxy lower alkyl)-1-lower alkyl-2H-1,4-benzodiazepin-2-one.

10. A compound as defined in claim 9 of the formula 1,3-dihydro - 5 - (2-fluorophenyl)-7-(1-hydroxyethyl)-1-methyl-2H-1,4-benzodiazepin-2-one.

11. A compound as defined in claim 4 of the formula 1,3-dihydro - 7 - (1-hydroxyethyl)-1-methyl-5-phenyl-2H-1,4-benzodiazepin-2-one.

12. A compound as defined in claim 4 of the formula 1,3 - dihydro-5-(2-fluorophenyl)-7-(1-hydroxy-1-methylethyl)-1-R$_3$-2H-1,4-benzodiazepin-2-one wherein R$_3$ is selected from the group consisting of hydrogen and methyl.

13. A compound as defined in claim 1 of the formula

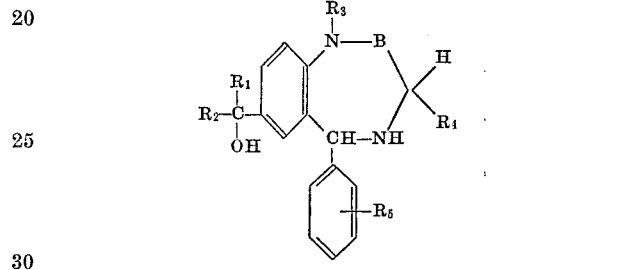

wherein B is selected from the group consisting of methylene and carbonyl, R$_1$, R$_2$ and R$_3$ and R$_4$ are each selected from the group consisting of hydrogen and lower alkyl and R$_5$ is selected from the group consisting of hydrogen and halogen
and the pharmaceutically acceptable acid addition salts thereof.

14. A compound as in claim 12 wherein R$_4$ is hydrogen.

15. A compound as defined in claim 13 wherein B is carbonyl.

16. A compound as defined in claim 15 of the formula 7-(1 - hydroxyethyl)-5-phenyl-1,3,4,5-tetrahydro-2H-1,4-benzodiazepin-2-one.

17. A compound as defined in claim 15 of the formula 7-(1 - hydroxyethyl)-5-R$_5$ phenyl-1-R$_3$-1,3,4,5-tetrahydro-2H-1,4-benzodiazepin-2-one wherein R$_3$ is selected from the group consisting of hydrogen and methyl and R$_5$ is selected from the group consisting of hydrogen and fluorine.

18. A compound as defined in claim 14 of the formula 2,3-dihydro - 5 - (2-fluorophenyl)-7-(1-hydroxyethyl)-1-methyl-1H-1,4-benzodiazepine.

19. A compound as defined in claim 14 of the formula 2,3-dihydro - 5 - (2 - fluorophenyl)-7-(1-hydroxyethyl)-1H-1,4-benzodiazepine.

20. A compound as defined in claim 1 of the formula

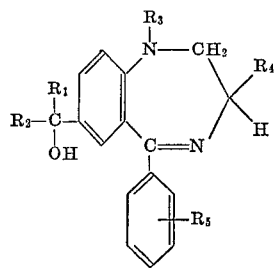

wherein R$_1$, R$_2$, R$_3$ and R$_4$ are selected from the group consisting of hydrogen and lower alkyl and R$_5$ is selected from the group consisting of hydrogen and halogen.

21. A compound as in claim 20 wherein $R_4$ is hydrogen, $R_1$, $R_2$, $R_3$ and $R_4$ are selected from the group consisting of hydrogen and methyl and $R_5$ is selected from the group consisting of hydrogen and halogen.

22. A compound as in claim 21 of the formula 7-acetyl-2,3-dihydro - 5 - (2 - fluorophenyl)-1-$R_3$-1H-1,4-benzodiazepine wherein $R_3$ is hydrogen or methyl.

23. A compound as in claim 22 of the formula 7-acetyl-2,3-dihydro - 5 - (2 - fluorophenyl)-1-methyl-1H-1,4-benzodiazepine.

References Cited

UNITED STATES PATENTS 3,222,359  12/1965  Reeder et al. _____ 260—239

ALTON D. ROLLINS, Primary Examiner

U.S. Cl. X.R.

260—239.3 D, 307 D, 340.9, 456 A, 558 R, 562 N, 562 B, 570 AB; 424—244

UNITED STATES PATENT OFFICE
CERTIFICATE OF CORRECTION

Patent No. 3,682,892　　　　　　　　Dated August 8, 1972

Inventor(s) Robert Ye-Fong Ning and Leo Henryk Sternbach

It is certified that error appears in the above-identified patent and that said Letters Patent are hereby corrected as shown below:

Column 13, line 28 in claim 1, the formula reading:

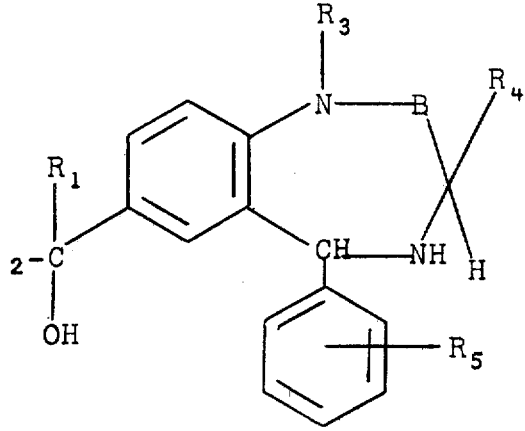

should read

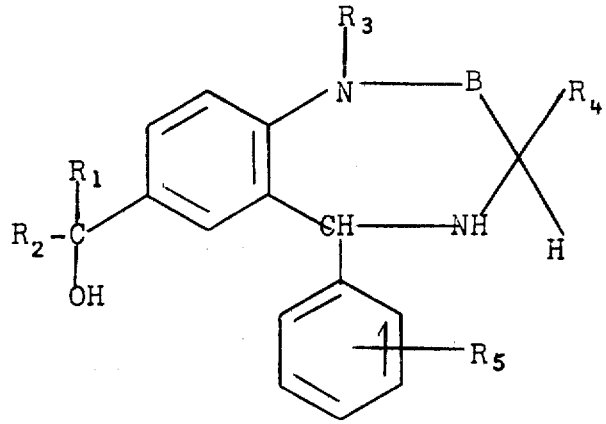

Signed and sealed this 22nd day of May 1973.

(SEAL)
Attest:

EDWARD M. FLETCHER, JR.　　　　　　ROBERT GOTTSCHALK
Attesting Officer　　　　　　　　　　Commissioner of Patents